(12) United States Patent
Ngo-Beelmann et al.

(10) Patent No.: US 6,233,939 B1
(45) Date of Patent: May 22, 2001

(54) METHOD OF OPERATING A STEAM POWER STATION

(75) Inventors: Ung-Lap Ngo-Beelmann, Karlsruhe; Klaus Behnke, Schriesheim; Michael Witt, Mannheim, all of (DE)

(73) Assignee: ABB Patent GmbH, Mannheim (DE)

( * ) Notice: Subject to any disclaimer, the term of this patent is extended or adjusted under 35 U.S.C. 154(b) by 0 days.

(21) Appl. No.: 09/580,864

(22) Filed: May 30, 2000

(30) Foreign Application Priority Data

May 28, 1999 (DE) .............................................. 199 24 593

(51) Int. Cl.[7] ...................................................... F01K 7/34
(52) U.S. Cl. ................................................. 60/653; 60/679
(58) Field of Search ................................ 60/653, 666, 679

(56) References Cited

U.S. PATENT DOCUMENTS

| | | | |
|---|---|---|---|
| 4,031,706 | * 6/1977 | Vakil et al. ............................. | 60/644 |
| 4,887,431 | * 12/1989 | Peet ........................................ | 60/667 |
| 5,392,606 | * 2/1995 | Labinov et al. ........................ | 60/673 |
| 5,526,386 | * 6/1996 | Tsiklauri et al. ....................... | 376/317 |
| 5,937,652 | * 8/1999 | Abdelmalek ........................ | 60/653 X |
| 6,089,023 | * 7/2000 | Anderson et al. ..................... | 60/653 |

\* cited by examiner

*Primary Examiner*—Hoang Nguyen
(74) *Attorney, Agent, or Firm*—Herbert L. Lerner; Laurence A. Greenberg; Werner H. Stemer

(57) ABSTRACT

In a steam power station, the condensate used as feedwater is preheated up close to the boiling temperature by means of partial steam mass flows from the turbine steam quantity. Due to the steam extraction, the following steam-turbine stages can draw less power from the steam fluid. To avoid the reduction in the power output at the following steam-turbine stages, provision is made for the waste heat from fuel cells to be used for preheating the condensate. Due to the preheating of the feedwater from the waste heat of the fuel cells and the associated increase in the steam quantity participating in the expansion, an increase in the efficiency of the steam process is achieved.

8 Claims, 1 Drawing Sheet

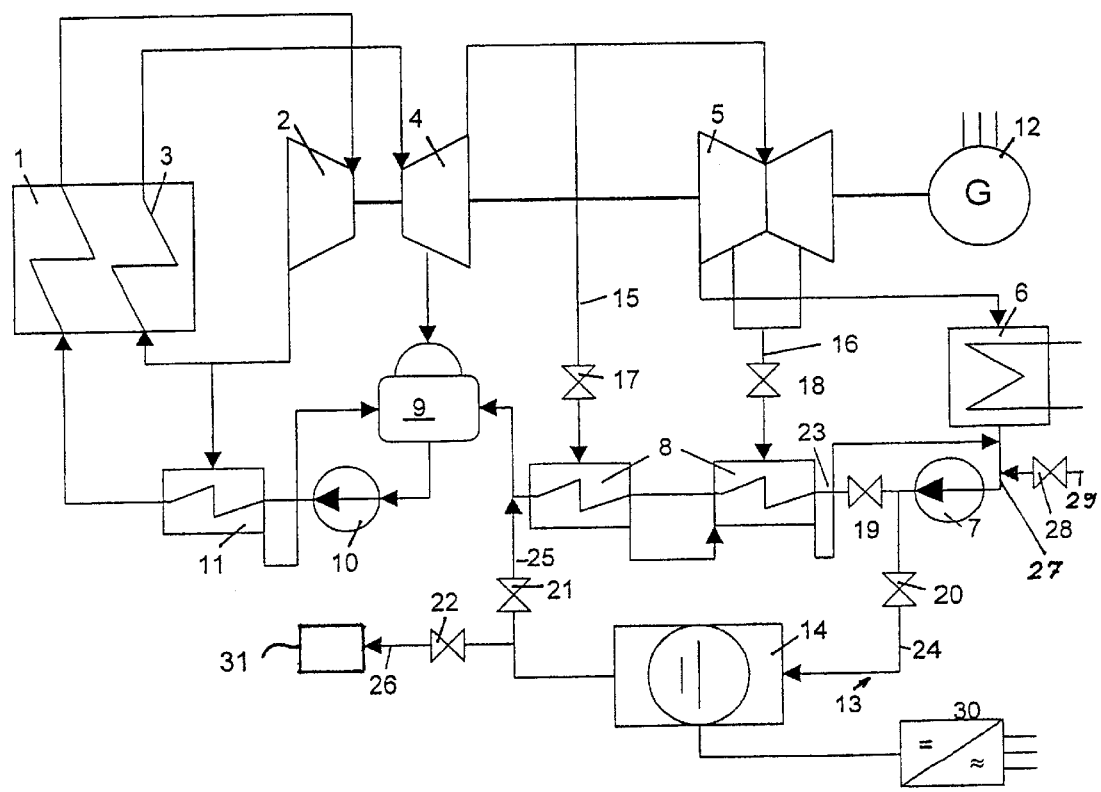

METHOD OF OPERATING A STEAM POWER STATION

BACKGROUND OF THE INVENTION

Field of the Invention

The invention relates to a method of operating a steam power station. Steam generated in an evaporator is condensed in a condenser after flowing through at least one turbine. The resulting condensate is preheated and supplied to the evaporator as feedwater.

In such conventional steam power stations it is suggested that the condensate used as feedwater be preheated up close to the boiling temperature by means of partial steam mass flows from the turbine steam content. As a result, the thermodynamic efficiency of the entire process increases. However, due to the steam extraction, the following steam-turbine stages can draw less power from the steam fluid.

SUMMARY OF THE INVENTION

It is accordingly an object of the invention to provide a novel method of operating a steam power plant, which overcomes the above-mentioned disadvantages of the heretofore-known devices and methods of this general type and which, despite a thermodynamic increase in the efficiency of the entire process, prevents a reduction in the power output at the following steam-turbine stages.

With the foregoing and other objects in view there is provided, in accordance with the invention, a method of operating a steam power station, which comprises:
generating steam in an evaporator;
conducting the steam through at least one turbine;
subsequently condensing the steam in a condenser to obtain condensate;
operating a fuel cell and generating waste heat; and
preheating the condensate obtained in the condensing step with the waste heat from the fuel cells and supplying the preheated condensate to the evaporator as feedwater.

In other words, the feedwater is used directly for cooling the fuel-cell process, in the course of which the temperature of the condensate increases. Due to the preheating of the feedwater from the waste heat of the fuel cells and the associated increase in the steam quantity participating in the expansion, an increase in the efficiency of the steam process is achieved.

In accordance with another feature of the invention, the condensate obtained in the condensing step is preheated with the waste heat from the fuel cells and a heat content of a partial steam quantity tapped from the steam-turbine process, before it is supplied back to the evaporator as feedwater. This is thus a combination of external heat supply via the fuel cells and a partial steam quantity from the steam-turbine process. The preheating can therefore be adapted in a flexible manner to the criteria of the entire process.

With the above and other objects in view there is also provided, in accordance with the invention, a steam power station in which the above-noted method is applied. The power station comprises an evaporator for generating steam, at least one turbine connected to receive the steam generated in the evaporator, a condenser connected to receive the steam after having traversed the at least one turbine and for producing a condensate, a line connection between the condenser and the evaporator for feeding back the condensate to the evaporator, an apparatus for preheating the condensate connected to the condenser, and at least one fuel cell generating waste heat for heating the condensate.

In other words, the steam power station for carrying out the method includes a fuel-cell arrangement integrated in the preheating apparatus. The extensive use of the conventional power-station components permits simple implementation of the concept according to the invention even in existing plants.

In accordance with an additional feature of the invention, there is provided a bypass line in which the at least one fuel cell is connected, the bypass line circumventing the apparatus, a throttle valve connected in a feed leading to the at least one fuel-cell and a throttle valve connected in a return leading away from the at least one fuel-cell, a condensate pump connected to the condeser, a line connected between the condensate pump and the apparatus, a further throttle valve in connected in the line between the condensate pump and the apparatus, a feed branching off from between the condensate pump and the further throttle valve, and a connecting line with a throttle valve running between the at least one turbine and the apparatus.

In accordance with another feature of the invention, the at least one fuel cell is one of a plurality of fuel cells disposed in a fuel cell block or fuel cell arrangement.

Here, variable flow ratios can be set as a function of the thermodynamic conditions. It is possible to heat the condensate simultaneously by the tapped steam of a turbine stage and by the fuel-cell waste heat. Likewise, heating of the condensate can be carried out solely with the fuel-cell arrangement or solely with the tapped turbine steam quantity.

In accordance with a further feature of the invention, the preheated condensate is passed into the system at different positions between the apparatus and the evaporator. The positions are determined in dependence on the waste-heat capacity of the fuel cells.

In accordance with again a further feature of the invention, the condensate heated by the waste heat of the fuel cell(s) can be supplied to a heat sink.

In accordance with a concomitant feature of the invention, an inverter is connected downstream of the fuel-cell block.

To increase the flexibility, a pure steam process, a combined fuel-cell/steam process or a pure fuel-cell operation is optionally possible.

Other features which are considered as characteristic for the invention are set forth in the appended claims.

Although the invention is illustrated and described herein as embodied in a method of operating a steam power station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing is a diagrammatic illustration of the sequence of a combined fuel-cell/steam process.

DESCRIPTION OF THE PREFERRED EMBODIMENT

Referring now to the FIGURE of the drawing in detail, the conventional steam cycle is effected via an evaporator 1, a high-pressure turbine 2, a reheater 3, an intermediate-pressure turbine 4, a low-pressure turbine 5, a condenser 6, a condensate pump 7, a preheating apparatus 8, a mixing preheater 9, a feedwater pump 10 and via a feedwater preheater 11 back to the evaporator 1. The shaft output of the turbine assembly is converted into electrical power in a generator 12 and delivered to the electrical network.

According to the invention, fuel cells 14 of predeterminable output are connected in a bypass 13 that circumvents the preheating apparatus 8. Throttle or control valves 17, 18 are located in lines 15, 16 that branch off from the steam system and lead to the preheating apparatus 8. The same throttle valves 19, 20, 21 and 22 are arranged in the condensate supply line 23, the feed and return lines 24, 25 of the fuel cells 14 and in a connecting line 26 that leads to a heat sink which is diagrammatically indicated at 31.

When the throttle valves 17, 18, 19 and 22 are closed and the throttle valves 20, 21 open, the condensate fed in via a line 27 or the feedwater made available via a line 29 which can be shut off by a valve 28 is directed from the condensate pump 7 to the fuel cells 14. The condensate absorbs the waste heat of the fuel-cell process. Condensate (feedwater) which is now heated passes via the return line 25 to the mixing preheater 9, from where, after a further feedwater preheater 11, it passes to the evaporator 1. In the aforesaid throttle-valve constellation, the preheating is effected solely by the waste heat of the fuel-cell operation, so that the steam quantity previously required for producing the preheating is saved and the generator output is increased. The waste heat of the fuel-cell process may also be injected following the feedwater pump 10. In this case, the feedwater preheater 11 may be completely or partly throttled. The electrical power produced in the fuel-cell process is delivered to the electrical network via an inverter 30. Depending on the level of the working temperature of the fuel cells 14 used, the feedback of the preheated feedwater may already be effected in the region of the return line 25 or not until after the mixing preheater 9 or after the feedwater preheater 11.

As soon as the throttle valves 17, 18, 19, 20 and 21 are only partly open, a combined fuel-cell/steam process results. This enables the power demand to be influenced. A lower generator output, for example, permits preheating by means of steam, and this preheating enables the fuel-cell waste heat to be utilized via the heat sink, such as district heating for example, accessible by opening the throttle valve 22.

We claim:
1. A method of operating a steam power station, which comprises:
   generating steam in an evaporator;
   conducting the steam through at least one turbine;
   subsequently condensing the steam in a condenser to obtain condensate;
   operating a fuel cell and generating waste heat; and
   preheating the condensate obtained in the condensing step with the waste heat from the fuel cells and supplying the preheated condensate to the evaporator as feedwater.

2. A method of operating a steam power station, which comprises:
   generating steam in an evaporator;
   conducting the steam through at least one turbine;
   subsequently condensing the steam in a condenser to obtain condensate;
   operating a fuel cell and generating waste heat; and
   preheating the condensate obtained in the condensing step with the waste heat from the fuel cells and a heat content of a partial steam quantity tapped from the steam-turbine process, and supplying the preheated condensate to the evaporator as feedwater.

3. A steam power station, comprising an evaporator for generating steam, at least one turbine connected to receive the steam generated in said evaporator, a condenser connected to receive the steam after having traversed said at least one turbine and for producing a condensate, a line connection between said condenser and said evaporator for feeding back the condensate to the evaporator, an apparatus for preheating the condensate connected to said condenser, and at least one fuel cell generating waste heat for heating the condensate.

4. The steam power station according to claim 3, which comprises a bypass line in which said at least one fuel cell is connected, said bypass line circumventing said apparatus, a throttle valve connected in a feed leading to said at least one fuel-cell and a throttle valve connected in a return leading away from said at least one fuel-cell, a condensate pump connected to said condeser, a line connected between said condensate pump and said apparatus, a further throttle valve in connected in said line between said condensate pump and said apparatus, a feed branching off from between said condensate pump and said further throttle valve, and a connecting line with a throttle valve running between said at least one turbine and said apparatus.

5. The steam power station according to claim 3, wherein said at least one fuel cell is one of a plurality of fuel cells disposed in a fuel cell block.

6. The steam power station according to claim 3, wherein the preheated condensate is passed into the system at different positions between said apparatus and said evaporator.

7. The steam power station according to claim 3, wherein the condensate heated by the waste heat of said at least one fuel cell can be supplied to a heat sink.

8. The steam power station according to claim 5, which comprises an inverter connected downstream of said fuel-cell block.

* * * * *